(12) United States Patent
Zhang

(10) Patent No.: US 12,598,023 B2
(45) Date of Patent: Apr. 7, 2026

(54) ERROR CORRECTION DATA TRANSMISSION METHOD, COMMUNICATIONS APPARATUS, AND STORAGE MEDIUM

(71) Applicant: SHENZHEN YINWANG INTELLIGENT TECHNOLOGIES CO., LTD., Shenzhen (CN)

(72) Inventor: Xingxin Zhang, Chengdu (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 440 days.

(21) Appl. No.: 18/185,988

(22) Filed: Mar. 17, 2023

(65) Prior Publication Data

US 2023/0261787 A1 Aug. 17, 2023

Related U.S. Application Data

(63) Continuation of application No. PCT/CN2020/116312, filed on Sep. 18, 2020.

(51) Int. Cl.
*H04L 1/00* (2006.01)
*H04L 5/00* (2006.01)

(52) U.S. Cl.
CPC .......... *H04L 1/0061* (2013.01); *H04L 5/0053* (2013.01)

(58) Field of Classification Search
CPC ... H04L 1/0061; H04L 5/0053; H04L 1/1614; H04L 1/1664; H04L 1/1819; H04L 1/1896; H04L 1/0057; H04L 1/1812
See application file for complete search history.

(56) References Cited

U.S. PATENT DOCUMENTS

2004/0073861 A1* 4/2004 Lauer .................... H04L 1/0071
714/762
2005/0193312 A1* 9/2005 Smith ............... H03M 13/3761
714/755

(Continued)

FOREIGN PATENT DOCUMENTS

CN 101674153 A 3/2010
CN 101834700 A 9/2010

(Continued)

OTHER PUBLICATIONS

Document: R1-1703774, Nokia, et al., "Short block codes for eMBB control channels," 3GPP TSG-RAN WG1 Meeting #88, Athens, Greece, Feb. 13-17, 2017, 10 pages.

(Continued)

*Primary Examiner* — Gary Mui
*Assistant Examiner* — Yewon Kim
(74) *Attorney, Agent, or Firm* — Conley Rose, P.C.

(57) ABSTRACT

A data transmission method includes generating a first code block, where the first code block includes a first load and a first redundancy code, the first load includes N second code blocks, the first redundancy code is used to perform error correction on the first load, an $i^{th}$ second code block includes a second load and a second redundancy code, the second redundancy code is used to perform error detection on the second load in the $i^{th}$ second code block, a value of i is an integer ranging from 1 to N, and N is an integer greater than or equal to 1; and sending the first code block to a receive end.

26 Claims, 7 Drawing Sheets

(56) References Cited

U.S. PATENT DOCUMENTS

| | | | |
|---|---|---|---|
| 2012/0117446 A1 | 5/2012 | Nasrabadi et al. | |
| 2016/0080115 A1 | 3/2016 | Josiam et al. | |
| 2017/0170925 A1 | 6/2017 | Xu et al. | |
| 2017/0279464 A1 | 9/2017 | Noh et al. | |
| 2017/0359150 A1 | 12/2017 | Xu et al. | |
| 2018/0115326 A1* | 4/2018 | Aharony | H03M 13/3707 |
| 2018/0159660 A1 | 6/2018 | Jia et al. | |
| 2019/0074933 A1 | 3/2019 | Ohta et al. | |
| 2019/0199378 A1* | 6/2019 | Mansour | H03M 13/2966 |
| 2020/0145139 A1* | 5/2020 | Merlin | H04L 1/1812 |
| 2021/0036806 A1* | 2/2021 | Lee | H04L 1/1685 |
| 2022/0123871 A1* | 4/2022 | Kimura | H04L 1/1864 |
| 2024/0364455 A1* | 10/2024 | Liu | H04L 1/0061 |

FOREIGN PATENT DOCUMENTS

| | | |
|---|---|---|
| CN | 103312458 A | 9/2013 |
| CN | 105306165 A | 2/2016 |
| CN | 105634504 A | 6/2016 |
| CN | 110140311 A | 8/2019 |
| CN | 111181700 A | 5/2020 |
| JP | 2007151171 A | 6/2007 |
| JP | 2014502094 A | 1/2014 |
| JP | 2018527770 A | 9/2018 |
| JP | 2018535596 A | 11/2018 |
| KR | 20120062544 A | 6/2012 |

OTHER PUBLICATIONS

R1-073310, Nortel, "FEC Code Block-based CRC," 3GPP TSG-RAN Working Group 1 Meeting #50, Athens, Greece, Aug. 20-24, 2007, 4 .pages.

IEEE Std 802.3ch™-2020, "IEEE Standard for Ethernet, Amendment 8: Physical Layer Specifications and Management Parameters for 2.5 GB/s, 5 GB/s, and 10 GB/s Automotive Electrical Ethernet," Jun. 4, 2020, 207 pages.

* cited by examiner

Transmit end 10

...

Transmit end 10

Receive end 20

Transmit end

Receive end

201: Generate a first code block

202: Send the first code block

ERROR CORRECTION DATA TRANSMISSION METHOD, COMMUNICATIONS APPARATUS, AND STORAGE MEDIUM

CROSS-REFERENCE TO RELATED APPLICATIONS

This is a continuation of International Patent Application No. PCT/CN2020/116312 filed on Sep. 18, 2020, the disclosure of which is hereby incorporated by reference in its entirety.

TECHNICAL FIELD

This application relates to the field of communications technologies, and specifically, to a data transmission method, a communications apparatus, and a storage medium.

BACKGROUND

With development of science and technology, intelligent vehicles (intelligent car), especially self-driving cars, become an important development direction of the global automobile industry. Various vehicle-mounted devices in a vehicle play a very important role in processes such as intelligent driving, assisted driving, self-driving, and communication of an intelligent car. Various perception data or communication data is transmitted at any time in a driving process of a vehicle. This plays an important role in vehicle interconnection, vehicle-to-vehicle communication, and vehicle-to-people communication, and effectively improves safety and comfort of car driving. Further, a self-driving vehicle may detect information about a car position and a surrounding object by using devices such as an acoustic wave radar, a laser radar, a navigation system, an odometer, an accelerometer, and a camera, and may interpret the detected information and identify a navigation path by using a control system, to drive an execution apparatus to complete a self-driving process.

Currently, in the communications field, a requirement for a bit error rate (BER) of data is high. For example, in the in-vehicle communications field, a BER should reach an order of magnitude of $10^{-10}$ to $10^{-12}$. For data transmission between some key sensors and controllers, for example, data transmission between a self-driving high-precision camera, a laser radar, and a multi-domain controller (MDC), a requirement for a BER may reach an order of magnitude of $10^{-15}$.

In the industry, various redundancy encoding mechanisms are usually used to improve data transmission reliability. However, problems of a transmission delay and overheads are caused at the same time. How to balance reliability and a transmission delay is an urgent problem to be resolved.

SUMMARY

Embodiments of this application provide a data transmission method, a communications apparatus, and a storage medium. Error correction and error detection are performed on to-be-transmitted data, to improve data transmission reliability and reduce a transmission delay.

According to a first aspect, an embodiment of this application provides a data transmission method. The method may be performed by a transmit end, or may be performed by a chip applied to a transmit end. The following provides description by using an example in which the method is performed by a transmit end. The method includes: generating a first code block, where the first code block includes a first load and a first redundancy code, the first load includes N second code blocks, the first redundancy code is used to perform error correction on the first load, the $i^{th}$ second code block includes a second load and a second redundancy code, the second redundancy code is used to perform error detection on the second load in the $i^{th}$ second code block, a value of i is an integer ranging from 1 to N, and N is an integer greater than or equal to 1; and sending the first code block to a receive end.

It can be learned that the first code block includes a first redundancy code used for error correction, and each second code block includes a second code block used for error detection. After receiving the first code block, the receive end first performs error correction on the first load by using the first redundancy code, thereby reducing bits that are incorrectly transmitted in the first load. Then, error detection is performed on each second code block by using the second redundancy code of each second code block, to determine specific second code blocks that are in the N second code blocks and that have error bits, that is, failing to be received. In this way, the receive end may indicate the transmit end to retransmit these second code blocks instead of indicating the transmit end to retransmit the entire first code block, thereby improving retransmission efficiency and meeting requirements for high reliability and a low delay of data transmission.

It should be understood that, if the transmit end and the receive end are devices in an in-vehicle system, reliability of data transmission in the in-vehicle communications field is improved by using the foregoing data transmission method, a transmission delay is reduced, and a data transmission requirement in the in-vehicle communications field is met.

In some possible implementations, the method further includes: receiving first acknowledgment information from the receive end, where the first acknowledgment information indicates a receiving status of at least one of the N second code blocks.

It should be understood that the first acknowledgment information may indicate unsuccessfully received second code blocks in the N second code blocks. The transmit end may retransmit these unsuccessfully received second code blocks based on the first acknowledgment information, to retransmit some load in the first code block, and improve retransmission efficiency.

In some possible implementations, the first redundancy code is obtained by performing Reed-Solomon forward error correction (RS-FEC) encoding on the first load, and the second redundancy code is obtained by performing cyclic redundancy check (CRC) encoding on the second load in the $i^{th}$ second code block.

In some possible implementations, the second load in the $i^{th}$ second code block includes indication information and to-be-transmitted data, and the indication information is used to indicate an identifier of the $i^{th}$ second code block.

It can be learned that the indication information in the second code block is used to indicate the identifier of the second code block, so that the receive end can determine unsuccessfully received second code blocks, and further send the first acknowledgment information to the transmit end, to trigger the transmit end to retransmit these second code blocks and successfully retransmit some load in the first code block.

In some possible implementations, the indication information in the $i^{th}$ second code block is further used to indicate a code block type of the $i^{th}$ second code block, and the code block type includes a retransmission-supported type or a retransmission-unsupported type.

It can be learned that the indication information of each second code block is used to indicate the code block type of each code block. In this way, when failing to receive a second code block and identifying that the code block type of the second code block is the retransmission-unsupported type, the receive end does not need to wait for retransmission of the second code block, and can process a subsequently successfully received second code block in a timely manner, thereby reducing a processing delay. In addition, the receive end may not need to feed back a receiving status of the second code block to the transmit end, and the second code block is considered by default to be successfully received, so that feedback overheads of the first acknowledgment information may be reduced.

In some possible implementations, when a value of the indication information is a first preset value, the code block type of the $i^{th}$ second code block is the retransmission-unsupported type; or when a value of the indication information is not a first preset value, the code block type of the $i^{th}$ second code block is the retransmission-supported type.

In some possible implementations, the indication information in the $i^{th}$ second code block is further used to indicate a code block type of at least one second code block before the $i^{th}$ second code block, and the code block type includes the retransmission-supported type or the retransmission-unsupported type.

It can be learned that the indication information in the $i^{th}$ code block is used to indicate the code block type of the at least one second code block before the $i^{th}$ second code block, so that when successfully receiving the $i^{th}$ second code block, the receive end can determine the code block type of the second code block before the $i^{th}$ second code block. If it is determined that a code block type of a second code block before the $i^{th}$ second code block is the retransmission-unsupported type, and the second code block is not successfully received, the receive end does not need to wait for retransmission of the second code block, and can process a subsequently successfully received second code block in a timely manner, thereby reducing a processing delay. In addition, in this case, the receive end may not need to feed back a receiving status of the second code block to the transmit end, and the second code block is considered by default to be successfully received, so that feedback overheads of the first acknowledgment information may be reduced.

In some possible implementations, the indication information in the $i^{th}$ second code block is further used to indicate that to-be-transmitted data of the $i^{th}$ second code block includes padding bits.

If wired transmission is performed between the transmit end and the receive end, it can be learned that a manner of adding the padding bits to the first code block can ensure that a transmission rate is always a fixed value, and further ensure data transmission stability. In addition, the indication information in the $i^{th}$ second code block is further used to indicate that the to-be-transmitted data of the $i^{th}$ second code block includes padding bits, so that the receive end determines that the $i^{th}$ second code block is invalid data, and may directly discard the second code block, thereby reducing processing complexity.

In some possible implementations, the to-be-transmitted data includes at least one to-be-transmitted data segment, and a length of each to-be-transmitted data segment in the at least one to-be-transmitted data segment is an integer multiple of a sum of a length of the indication information and a length of the second redundancy code.

It can be learned that the length of each to-be-transmitted data segment in the second code block is set to an integer multiple of a sum of the length of the indication information and the length of the second redundancy code. In this way, when channel quality is good, for example, when error detection does not need to be performed on the second code block and RS-FEC encoded data can be directly used for transmission, the to-be-transmitted data can be placed at locations corresponding to the indication information and the second redundancy code, thereby further improving data transmission efficiency.

In some possible implementations, the receiving first acknowledgment information from the receive end includes: receiving a third code block from the receive end, where the third code block includes the first acknowledgment information and a third redundancy code, and the third redundancy code is used to perform error correction on the first acknowledgment information.

It can be learned that in a process of feeding back the first acknowledgment information, the receive end may encode the first acknowledgment information and the to-be-transmitted data of the receive end together, to form a third code block. In this way, the transmit end can perform error correction on the first acknowledgment information by using the third redundancy code in the third code block, thereby ensuring transmission stability of the first acknowledgment message. Because error correction may be performed on the first acknowledgment information by using the third redundancy code, error detection may not be separately performed on the first acknowledgment information, thereby further reducing feedback overheads of the first acknowledgment information.

In some possible implementations, the receiving first acknowledgment information from the receive end includes: receiving the first acknowledgment information from the receive end.

It can be learned that in a process of feeding back the first acknowledgment message, the receive end may separately feed back the first acknowledgment information, and does not need to encode the first acknowledgment information together with the to-be-transmitted data of the receive end to form the third code block before feeding back the first acknowledgment information, thereby improving flexibility of feeding back the first acknowledgment information. In addition, the transmit end may receive the first acknowledgment message earlier, decode the first acknowledgment message, and more quickly determine specific second code blocks that need to be retransmitted, thereby further improving retransmission efficiency.

In some possible implementations, the method further includes: retransmitting, to the receive end, at least one of the unsuccessfully received second code blocks in the N second code blocks based on the first acknowledgment information.

It can be learned that when the first code block is incorrectly transmitted, the transmit end needs to retransmit only at least one of the unsuccessfully received second code blocks to the receive end, and does not need to retransmit the entire first code block, thereby improving retransmission efficiency.

In some possible implementations, the method further includes: retransmitting, to the receive end based on the first acknowledgment information, at least one of the unsuccessfully received second code blocks that support retransmission and that are in the N second code blocks.

It can be learned that when the first code block is incorrectly transmitted, the transmit end needs to retransmit, to the receive end, only at least one of the unsuccessfully received second code blocks that support retransmission, and does not need to retransmit the entire first code block and some retransmission-unsupported second code blocks, thereby further improving retransmission efficiency.

According to a second aspect, an embodiment of this application provides a data transmission method, applied to a receive end. The method includes: receiving a first code block from a transmit end, where the first code block includes a first load and a first redundancy code, the first load includes N second code blocks, an $i^{th}$ second code block includes a second load and a second redundancy code, a value of i is an integer ranging from 1 to N, and N is an integer greater than or equal to 1; performing error correction on the first load by using the first redundancy code, and performing error detection on the second load in the $i^{th}$ second code block by using the second redundancy code.

It can be learned that after receiving the first code block, the receive end may first perform error correction on the first load by using the first redundancy code, to reduce bits that are incorrectly transmitted in the first load. Then, error detection is performed on each second code block by using the second redundancy code of each second code block, to determine unsuccessfully received second code blocks in the N second code blocks. In this way, the transmit end may be indicated to retransmit these second code blocks, and does not need to retransmit the entire first code block, thereby improving retransmission efficiency and meeting requirements for high reliability and a low delay of data transmission.

It should be understood that, if the transmit end and receive end are devices in an in-vehicle system, by using the foregoing data transmission method, reliability of data transmission in the in-vehicle communications field is improved, a transmission delay is reduced, and a requirement of the in-vehicle field for data transmission is met.

In some possible implementations, the method further includes: sending first acknowledgment information to the transmit end, where the first acknowledgment information indicates a receiving status of at least one of the N second code blocks.

It should be understood that the receive end may indicate the unsuccessfully received second code block in the N second code blocks by using the first acknowledgment information, so that the transmit end can retransmit the unsuccessfully received second code block based on the first acknowledgment information, thereby retransmitting some load in the first code block and improving retransmission efficiency.

In some possible implementations, the first redundancy code is obtained by performing RS-FEC encoding on the first load, and the second redundancy code is obtained by performing CRC encoding on the second load in the $i^{th}$ second code block.

In some possible implementations, the second load in the $i^{th}$ second code block includes indication information and to-be-transmitted data, and the indication information is used to indicate an identifier of the $i^{th}$ second code block.

It can be learned that because the second indication information of each second code block indicates the identifier of the second code block, when some second code blocks are not successfully received, the receive end determines specific second code blocks that are not successfully received, and further sends the first acknowledgment information to the transmit end, to trigger the transmit end to retransmit these second code blocks, so that some loads in the first code block are successfully retransmitted.

In some possible implementations, the indication information in the $i^{th}$ second code block is further used to indicate a code block type of the $i^{th}$ second code block, and the code block type includes a retransmission-supported type or a retransmission-unsupported type.

It can be learned that the indication information of each second code block is used to indicate the code block type of each second code block. In this way, when failing to receive a second code block and identifying that the code block type of the second code block is the retransmission-unsupported type, the receive end can process a subsequently successfully received second code block in a timely manner, thereby reducing a processing delay. In addition, a receiving status of the second code block may not need to be fed back to the transmit end, and the second code block is considered by default to be successfully received, so that feedback overheads of the first acknowledgment information is reduced.

In some possible implementations, when a value of the indication information is a first preset value, the code block type of the $i^{th}$ second code block is the retransmission-unsupported type; or when a value of the indication information is not a first preset value, the code block type of the $i^{th}$ second code block is the retransmission-supported type.

In some possible implementations, the indication information in the $i^{th}$ second code block is further used to indicate a code block type of at least one second code block before the $i^{th}$ second code block, and the code block type includes the retransmission-supported type or the retransmission-unsupported type.

It can be learned that the indication information in the $i^{th}$ code block is used to indicate the code block type of the at least one second code block before the $i^{th}$ second code block. In this way, when successfully receiving the $i^{th}$ second code block, the receive end may determine the code block type of the second code block before the $i^{th}$ second code block. If it is determined that the code block type of a second code block before the $i^{th}$ second code block is the retransmission-unsupported type, and the second code block is not successfully received, the receive end does not need to wait for retransmission of the second code block, and can process a subsequently successfully received second code block in a timely manner, thereby reducing a processing delay. In addition, a receiving status of the second code block may not need to be fed back to the transmit end, and the second code block is considered by default to be successfully received, so that feedback overheads of the first acknowledgment information can be reduced.

In some possible implementations, the indication information in the $i^{th}$ second code block is further used to indicate that to-be-transmitted data of the $i^{th}$ second code block includes padding bits.

If wired transmission is performed between the transmit end and the receive end, it can be learned that a manner of adding the padding bits to the first code block can ensure that a transmission rate is always a fixed value, and further ensure data transmission stability. In addition, the indication information in the $i^{th}$ second code block is further used to indicate that the to-be-transmitted data of the $i^{th}$ second code block includes padding bits, and the receive end may determine that the $i^{th}$ second code block is invalid data, and may directly discard the second code block, thereby reducing processing complexity.

In some possible implementations, the to-be-transmitted data includes at least one to-be-transmitted data segment, and a length of each to-be-transmitted data segment in the at least one to-be-transmitted data segment is an integer multiple of a sum of a length of the indication information and a length of the second redundancy code.

It can be learned that the length of each to-be-transmitted data segment in the second code block is set to an integer multiple of a sum of the length of the indication information and the length of the second redundancy code. In this way, when channel quality is good, for example, when error detection does not need to be performed on the second code block and RS-FEC encoded data can be directly used for transmission, the to-be-transmitted data can be placed at locations corresponding to the indication information and the second redundancy code, thereby further improving data transmission efficiency.

In some possible implementations, the sending first acknowledgment information to the transmit end includes sending a third code block to the transmit end, where the third code block includes the first acknowledgment information and a third redundancy code, and the third redundancy code is used to perform error correction on the first acknowledgment information.

It can be learned that in a process of feeding back the first acknowledgment information, the receive end may encode the first acknowledgment information and the to-be-transmitted data of the receive end together, to form a third code block. In this way, the transmit end performs error correction on the first acknowledgment information by using the third redundancy code in the third code block, thereby ensuring transmission stability of the first acknowledgment message. Because error correction may be performed on the first acknowledgment information by using the third redundancy code, error detection may not be separately performed on the first acknowledgment information, thereby further reducing feedback overheads of the first acknowledgment information.

In some possible implementations, the sending first acknowledgment information to the transmit end includes: sending the first acknowledgment information to the transmit end.

It can be learned that in a process of feeding back the first acknowledgment message, the receive end may separately feed back the first acknowledgment information, and does not need to encode the first acknowledgment information together with the to-be-transmitted data of the receive end to form the third code block before feeding back the first acknowledgment information, thereby improving flexibility of feeding back the first acknowledgment information. In this way, the transmit end can receive the first acknowledgment message earlier, decode the first acknowledgment message, and more quickly determine specific second code blocks that need to be retransmitted, thereby further improving retransmission efficiency.

In some possible implementations, the method further includes: receiving at least one of unsuccessfully received second code blocks that are in the N second code blocks and that are retransmitted by the transmit end.

It can be learned that when the first code block is incorrectly transmitted, the receive end receives only at least one of the unsuccessfully received second code blocks that are retransmitted by the transmit end, and the transmit end does not need to retransmit the entire first code block, thereby improving retransmission efficiency.

In some possible implementations, the method further includes: receiving at least one of the unsuccessfully received second code blocks, in the N second code blocks, that support retransmission and that are retransmitted by the transmit end.

It can be learned that when the first code block is incorrectly transmitted, the receive end receives only at least one of the unsuccessfully received second code blocks that support retransmission and that are retransmitted by the transmit end, and the transmit end does not need to retransmit the entire first code block and some retransmission-unsupported second code blocks, thereby further improving retransmission efficiency.

According to a third aspect, an embodiment of this application provides a communications apparatus. For beneficial effects, refer to the descriptions in the first aspect. Details are not described herein again. The communications apparatus has a function of implementing behavior in the method example in the first aspect. The function may be implemented by hardware, or may be implemented by hardware executing corresponding software. The hardware or the software includes one or more modules corresponding to the function. In a possible design, the communications apparatus includes a processing module and a transceiver module. The processing module is configured to generate a first code block, where the first code block includes a first load and a first redundancy code, the first load includes N second code blocks, the first redundancy code is used to perform error correction on the first load, the $i^{th}$ second code block includes a second load and a second redundancy code, the second redundancy code is used to perform error detection on the second load in the $i^{th}$ second code block, a value of i is an integer ranging from 1 to N, and N is an integer greater than or equal to 1. The transceiver module is configured to send a first code block to a receive end. These modules may perform corresponding functions in the method example in the first aspect. For details, refer to the detailed descriptions in the method example. Details are not described herein again.

According to a fourth aspect, an embodiment of this application provides a communications apparatus. For beneficial effects, refer to the descriptions in the second aspect. Details are not described herein again. The communications apparatus has a function of implementing behavior in the method example in the first aspect. The function may be implemented by hardware, or may be implemented by hardware executing corresponding software. The hardware or the software includes one or more modules corresponding to the function. In a possible design, the communications apparatus includes a transceiver module and a processing module. The transceiver module is configured to receive a first code block from a transmit end, where the first code block includes a first load and a first redundancy code, the first load includes N second code blocks, an $i^{th}$ second code block includes a second load and a second redundancy code, a value of i is an integer ranging from 1 to N, and N is an integer greater than or equal to 1. The processing module is configured to: perform error correction on the first load by using the first redundancy code, and perform error detection on the second load in the $i^{th}$ second code block by using the second redundancy code.

According to a fifth aspect, a communications apparatus is provided. The communications apparatus may be the transmit end in the foregoing method embodiments, or a chip disposed in the transmit end. The communications apparatus includes a communication interface and a processor, and optionally, further includes a memory. The memory is configured to store a computer program or instructions. The processor is coupled to the memory and the communications interface. When the processor executes the computer program or the instructions, the communications apparatus is enabled to perform the method performed by the transmit end in the foregoing method embodiments.

According to a sixth aspect, a communications apparatus is provided. The communications apparatus may be the receive end in the foregoing method embodiments, or a chip disposed in the receive end. The communications apparatus includes a communication interface and a processor, and optionally, further includes a memory. The memory is configured to store a computer program or instructions. The processor is coupled to the memory and the communications interface. When the processor executes the computer program or the instructions, the communications apparatus is enabled to perform the method performed by the receive end in the foregoing method embodiments.

According to a seventh aspect, a computer program product is provided. The computer program product includes computer program code. When the computer program code is run, the methods performed by the transmit end in the foregoing aspects are performed.

According to an eighth aspect, a computer program product is provided. The computer program product includes computer program code. When the computer program code is run, the methods performed by the receive end in the foregoing aspects are performed.

According to a ninth aspect, this application provides a chip system. The chip system includes a processor configured to implement functions of the transmit end in the methods in the foregoing aspects. In a possible design, the chip system further includes a memory configured to store program instructions and/or data. The chip system may include a chip, or may include a chip and another discrete device.

According to a tenth aspect, this application provides a chip system. The chip system includes a processor configured to implement functions of the receive end in the methods in the foregoing aspects. In a possible design, the chip system further includes a memory configured to store program instructions and/or data. The chip system may include a chip, or may include a chip and another discrete device.

According to an eleventh aspect, this application provides a computer-readable storage medium. The computer-readable storage medium stores a computer program. When the computer program is run, the methods performed by the transmit end in the foregoing aspects are implemented.

According to a twelfth aspect, this application provides a computer-readable storage medium. The computer-readable storage medium stores a computer program, and when the computer program is run, the methods performed by the receive end in the foregoing aspects are implemented.

According to a thirteenth aspect, this application provides a communications system, including the communications apparatus in the fifth aspect and the communications apparatus in the sixth aspect.

DESCRIPTION OF EMBODIMENTS

Figures 1, 2:
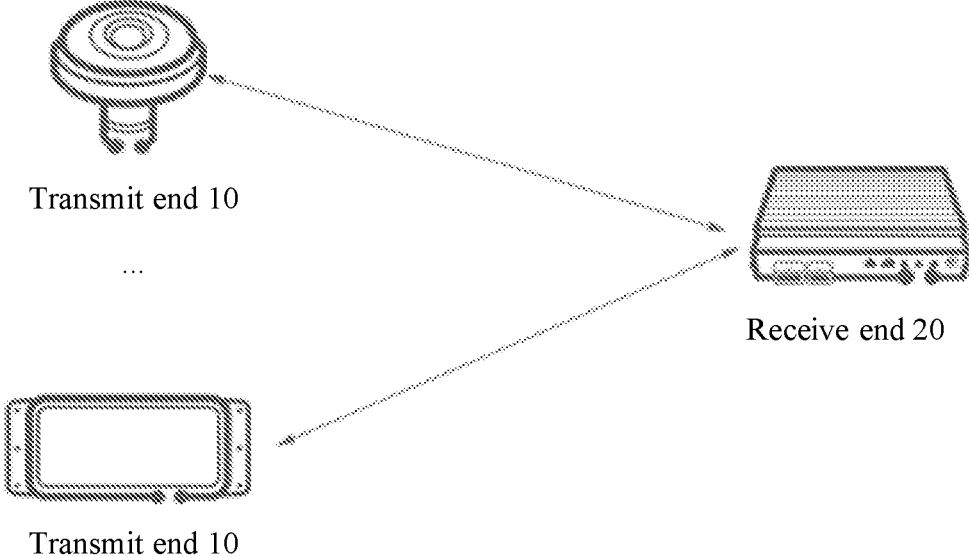
FIG. 1 is a schematic diagram of an architecture of a communications system according to an embodiment of this application.
FIG. 2 is a schematic flowchart of a data transmission method according to an embodiment of this application.

Technical solutions in embodiments of this application may be applied to various communications systems, for example, an in-vehicle system, a Long-Term Evolution (LTE) mobile communications system, and a 5th generation (5G) mobile communications system.

It should be understood that when the technical solutions of this application are applied to an in-vehicle system, a transmit end and a receive end in embodiments of this application may be an MDC, an in-vehicle large screen, a central control screen, and various sensors. Generally, the transmit end and the receive end communicate with each other by using a cable. The sensor includes a positioning system (the positioning system may be a Global Positioning System (GPS) system, a BeiDou system, or another positioning system), an inertial measurement unit (IMU), a radar (for example, a laser radar), a laser rangefinder, and a camera (for example, a high-definition camera). The sensor may further include a sensor of an internal system of a monitored vehicle (for example, an in-vehicle air quality monitor, a fuel gauge, or an engine oil thermometer).

It should be understood that when the technical solutions of this application are applied to an LTE mobile communications system and a 5G mobile communications system, the transmit end and the receive end in embodiments of this application may be one of a network device and user equipment (UE).

The UE may include a mobile phone (or referred to as a "cellular" phone), wireless user equipment, mobile user equipment, device-to-device (D2D) user equipment, vehicle-to-everything (V2X) UE, machine-to-machine/machine-type communications (M2M/MTC) user equipment, Internet of things (IoT) user equipment, a subscriber unit, a subscriber station, a mobile station, a remote station, an access point (AP), a remote terminal, an access terminal, a user terminal, a user agent, a user device, or the like.

The network device may be an access network (AN) device. The AN device may be a device that communicates with wireless user equipment over an air interface in an access network by using one or more cells, for example, a base station NodeB (for example, an access point), an evolved NodeB (NodeB, eNB, or e-NodeB, evolutional Node B), a new radio network device gNB, or a roadside unit (RSU). In addition, the AN device may further include a centralized unit (CU) and a distributed unit (DU) in a cloud radio access network (CloudRAN) system. The AN device is not limited in embodiments of this application.

For ease of understanding this application, related technical knowledge included in embodiments of this application is described herein first.

To improve reliability in a data transmission process, in an implementation, two encoding schemes are provided: RS-FEC encoding and CRC encoding.

A specific encoding scheme of the RS-FEC may be represented by RS (N, K, U), where U represents a quantity of bits corresponding to one unit, K represents a quantity of units of input data, and N represents a quantity of units of output data after encoding is performed. RS (360, 326, 10) is used as an example. The input data includes 3260 bits, and is divided into 326 input data units by using 10 bits as a unit. After RS-FEC encoding is performed on the input data, 360 units, that is, one 3600-bit RS code block, are output. The 360 units consist of 326 input data units and 34 redundancy units. The 326 input data units are loads of the RS code block, that is, valid data. The 34 redundancy units are redundancy codes of the RS code block, that is, invalid data. The 34 redundancy units are obtained by performing a Galois field operation on the 326 input data units, and are used to perform error correction on the 326 input data units.

The following uses an example to describe an implementation in which 34 redundancy units used for error correction are obtained through RS-FEC encoding.

For example, to-be-transmitted data may be represented by using Formula 1:

$$m(x) = m_{325} * x^{359} + m_{324} * x^{358} + \ldots + m_1 * x^{35} + m_0 * x^{34} \quad \text{(Formula 1)},$$

where coefficients $m_0$ to $m_{325}$ represent 326-bit to-be-transmitted data, and each coefficient corresponds to one 10-bit unit.

Then, a polynomial $g(x)$ is constructed by using a preset primitive polynomial. The transmit end and the receive end agree on a primitive polynomial. It is assumed that the primitive polynomial is $x^{10} + x^3 + 1$, and $\alpha$ is a primitive element of the primitive polynomial. In this case, the polynomial $g(x)$ may be represented by using Formula 2:

$$g(x) = \prod_{j=0}^{33} (x - \alpha^j) = g_{34} * x^{34} + g_{33} * x^{33} + \ldots + g_4 * x^4 + g_3 * x^3 + g_2 * x^2 + g_1 * x^1 + g_0. \quad \text{(Formula 2)}$$

Finally, a residual polynomial $p(x)$ of $m(x)/g(x)$ is determined by performing a Galois field operation, and the residual polynomial $p(x)$ may be represented by using Formula 3:

$$p(x) = p_{33} * x^{33} + p_{32} * x^{32} + \ldots + p_2 * x^2 + p_1 * x^1 + p_0 \quad \text{(Formula 3)}.$$

In the residual polynomial, 34 coefficients $p_0$ to $p_{33}$ are used for error correction, and each coefficient corresponds to one 10-bit unit. The 360 units including $m_{325}, m_{324}, \ldots, m_0$, $p_{33}, p_{32}, \ldots$, and $p_0$ are sequentially arranged to form one RS code block, and the transmit end sends the RS code block to the receive end. The receive end performs error correction on the 326 input data units by using the 34 redundancy units, to obtain correct valid data.

Therefore, RS-FEC encoding provides an error correction mechanism for data transmission. However, RS-FEC encoding can only resist an error in which a maximum quantity of consecutive error bits is (N−K)/2*U. Once a quantity of consecutive error bits in the RS code block exceeds (N−K)/

2*U, the receive end cannot restore the load. In this case, the transmit end needs to retransmit the entire RS code block. The entire RS code block includes a large quantity of bits. Consequently, an entire retransmission process is slow, and a large quantity of bandwidth resources are occupied.

For CRC encoding, the transmit end and the receive end agree on a generator polynomial in advance. A CRC check code is generated based on the generator polynomial and the input data; and the CRC check code is added to the input data bits, to obtain a CRC code block. The input data is a load of the CRC code block, that is, valid data. The CRC check code is a redundancy code of the CRC code block, and is invalid data. The receive end performs error detection on the load of the CRC code block by using the CRC check code. After the received load undergoes the same CRC processing as the transmit end, a local CRC check code is obtained. If the local CRC check code is the same as the received CRC check code, there is no error bit in the load; or if the local CRC check code is different from the received CRC check code, there is an error bit in the load.

CRC encoding provides an error detection mechanism, but cannot perform data correction. Once a transmission error occurs, the CRC code block needs to be retransmitted. In an entire data transmission process, a large quantity of CRC code blocks are retransmitted, resulting in a long transmission delay.

The foregoing encoding scheme cannot meet requirements for both high reliability and a low delay of data transmission in the communications field. How to balance reliability and a transmission delay is an urgent problem to be resolved.

FIG. 1 is a schematic diagram of an architecture of a communications system according to an embodiment of this application. The communications system includes a transmit end 10 and a receive end 20. It may be understood that the communications system may include one or more transmit ends, or may include one or more receive ends. FIG. 1 shows only two transmit ends and one receive end, but does not constitute a limitation on this application.

A method provided in this embodiment of this application includes: The transmit end 10 generates a first code block, where the first code block includes a first load and a first redundancy code, the first load includes N second code blocks, the first redundancy code is used to perform error correction on the first load, an $i^{th}$ second code block includes a second load and a second redundancy code, a second redundancy code in the $i^{th}$ second code block is used to perform error detection on a second load in the $i^{th}$ second code block, a value of i is an integer ranging from 1 to N (including 1 and N), and N is an integer greater than or equal to 1. In other words, the $i^{th}$ second code block may be any one of the N second code blocks. In addition, the first code block is sent to the receive end 20.

It should be understood that the receive end 20 may first perform error correction on the first load by using the first redundancy code, to improve transmission reliability of the first code block, and then perform error detection on each second code block by using the second redundancy code of each second code block. When detecting that an error occurs on a second code block, the receive end 20 may indicate the transmit end 10 to retransmit the second code block. In this way, when the first code block is incorrectly transmitted, the transmit end 10 may retransmit only some data carried in the first code block, thereby improving retransmission efficiency and reducing a transmission delay.

It should be understood that when the transmit end 10 and the receive end 20 are devices in an in-vehicle system, requirements for high reliability and a low delay of data transmission in the in-vehicle communications field can be met by using the technical solutions in this application.

FIG. 2 is a schematic flowchart of a data transmission method according to an embodiment of this application. This embodiment includes the following steps.

201: A transmit end generates a first code block.

Figure 3:
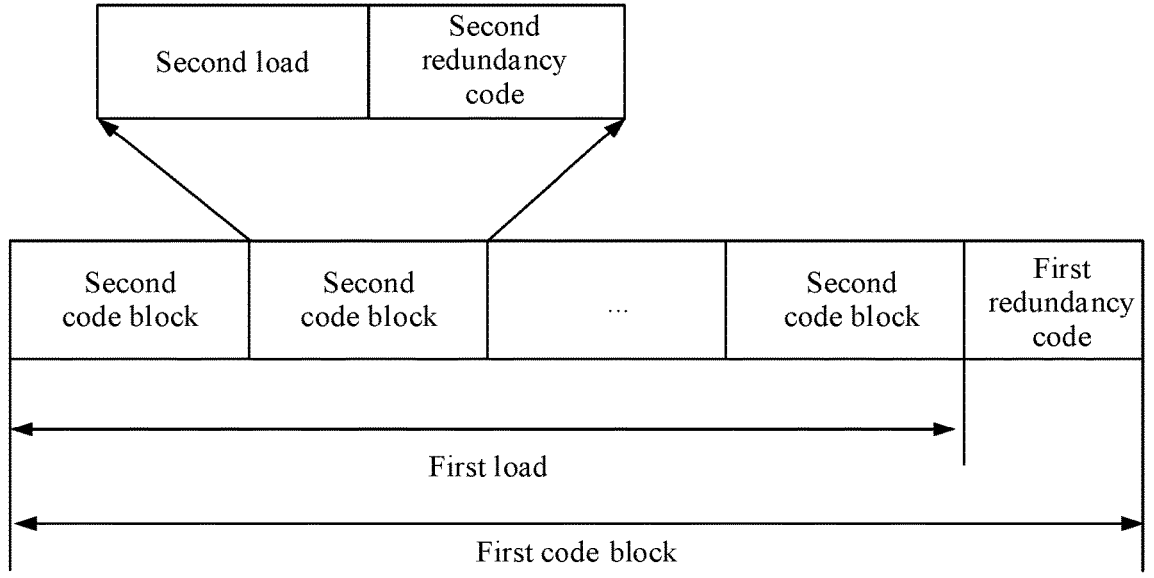
FIG. 3 is a schematic diagram of a first code block according to an embodiment of this application.

As shown in FIG. 3, the first code block includes a first load and a first redundancy code, the first load includes N second code blocks, the first redundancy code is used to perform error correction on the first load, the $i^{th}$ second code block includes the second load and the second redundancy code, the second redundancy code in the $i^{th}$ second code block is used to perform error detection on the second load in the $i^{th}$ second code block, and a value of i is an integer ranging from 1 to N (including 1 and N). In other words, the $i^{th}$ second code block may be any one of the N second code blocks, and N is an integer greater than or equal to 1.

For example, the second redundancy code in the $i^{th}$ second code block may be a CRC check code. In other words, the second load in the $i^{th}$ second code block is used as valid data in a CRC encoding process, CRC encoding is performed on the second load in the $i^{th}$ second code block to obtain the $i^{th}$ second code block, and the N second code blocks are encapsulated as valid data (the first load) in the RS-FEC encoding process. For example, the first redundancy code may be obtained by performing RS-FEC encoding on the first load, that is, RS-FEC encoding is performed on the N second code blocks to generate the first code block.

It should be understood that the foregoing RS-FEC encoding and CRC encoding are merely examples for description. In actual application, the first load and the second load may alternatively be encoded in another encoding manner, to obtain the first redundancy code and the second redundancy code. For example, low-density parity check (LPDC) and CRC encoding are used. An encoding scheme is not limited in this application.

Figure 4:
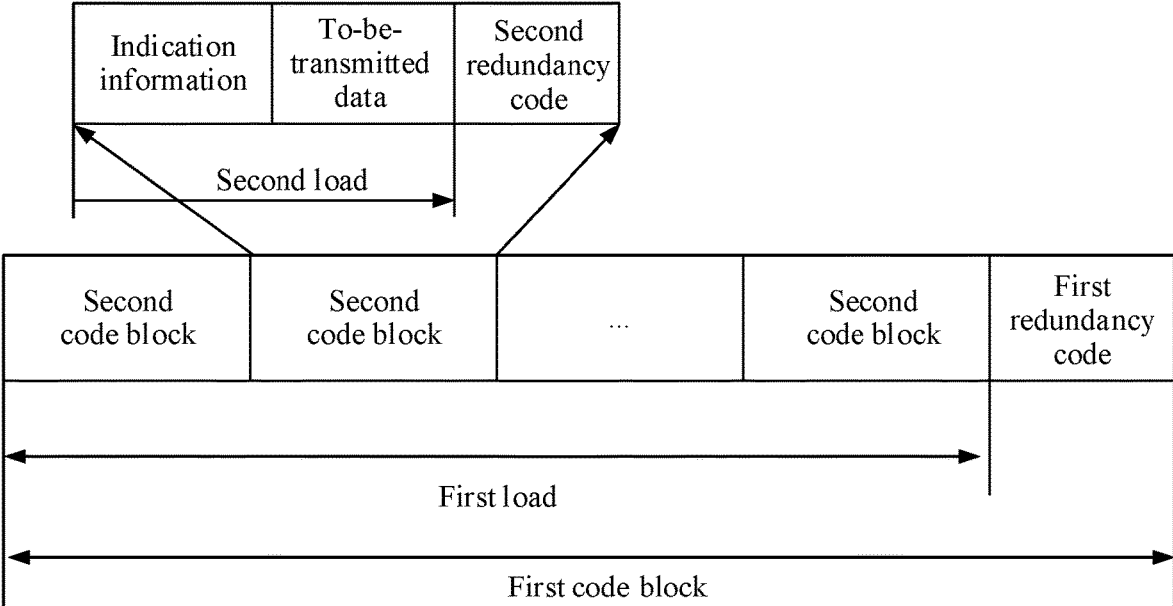
FIG. 4 is a schematic diagram of a second code block according to an embodiment of this application.

For example, as shown in FIG. 4, the second load in the $i^{th}$ second code block includes indication information and to-be-transmitted data. The indication information is used to indicate an identifier of the $i^{th}$ second code block, and the identifier may uniquely correspond to one second code block within a specific time range. For example, if a value of the indication information is 0001, it indicates that the $i^{th}$ second code block is the Pt second code block in the N second code blocks. After an identifier is added to each second code block, the receive end may feed back a receiving status of each second code block with reference to the identifier of each second code block. In this way, the transmit end may retransmit an unsuccessfully received second code block based on the receiving status of each second code block, and does not need to retransmit the entire first code block, thereby improving retransmission efficiency.

For example, the indication information in the $i^{th}$ second code block is further used to indicate a code block type of the $i^{th}$ second code block, and the code block type includes a retransmission-supported type or a retransmission-unsupported type. For example, when the to-be-transmitted data in the second code block is image data, the second code block is a second code block that does not support retransmission; or when the to-be-transmitted data in the second code block is a control message, the second code block is a second code block that supports retransmission.

Further, when the value of the indication information is a first preset value, the code block type of the $i^{th}$ second code block is the retransmission-unsupported type; or when the indication information is not the first preset value, the code block type of the $i^{th}$ second code block is the retransmission-supported type.

For example, the indication information includes four bits. When a value of the indication information is 0000, it indicates that the code block type of the second code block is the retransmission-unsupported type. When a value of the indication information is not 0000, it indicates that the code block type of the second code block is the retransmission-supported type.

Further, values of indication information in the second code blocks that support retransmission may be encoded in ascending order, and when the value of the indication information reaches a maximum value, the value of the indication information is automatically rolled back to a minimum value to continue encoding, so that the receive end can determine the code block type of the second code block by using continuity of the values of the indication information. When the second code blocks that support retransmission are transmitted for the first time, the second code blocks are sequentially transmitted in ascending order of the values of the indication information.

For example, if code block types of the $1^{st}$, the $3^{rd}$, and the $4^{th}$ second code blocks each are the retransmission-supported type, values of indication information in the $1^{st}$, the $3^{rd}$, and the $4^{th}$ second code blocks may be set to 0001, 0010, and 0011. If a code block type of the $2^{nd}$ code block is the retransmission-unsupported type, a value of indication information in the $2^{nd}$ second code block may be set to 0000. In this way, when the receive end successfully receives the $1^{st}$ second code block and the $3^{rd}$ second code block, and fails to receive the $2^{nd}$ second code block, because values of indication information in the Pt second code block and the $3^{rd}$ second code block are consecutive, the receive end determines that the unsuccessfully received $2^{nd}$ second code block is a second code block that does not support retransmission. When the receive end successfully receives the Pt second code block, the $2^{nd}$ second code block, and the $4^{th}$ code block, and fails to receive the $3^{rd}$ second code block, because identifiers of the $2^{nd}$ second code block and the $4^{th}$ second code block are nonconsecutive, the receive end may determine that the unsuccessfully received $3^{rd}$ second code block supports retransmission, and a value of the indication information is 0010.

For example, the indication information in the $i^{th}$ second code block is further used to indicate a code block type of at least one second code block before the $i^{th}$ second code block, and the code block type includes the retransmission-supported type or the retransmission-unsupported type.

For example, a code block type of at least one second code block before the $i^{th}$ second code block may be indicated in a bitmap manner.

For example, if the indication information in the $i^{th}$ second code block is used to indicate code block types of three second code blocks before the $i^{th}$ second code block, the code block types of the three second code blocks may be indicated by using three bits in the indication information. When a value of a bit is 1, it indicates that a code block type of a second code block corresponding to the bit is the retransmission-supported type; or when a value of a bit is 0, it indicates that a code block type of a second code block corresponding to the bit is the retransmission-supported type. It should be noted that when the $i^{th}$ second code block is the $1^{st}$ second code block in the first code block transmitted for the first time, values of the three bits may be all set to 0. It should be understood that, alternatively, 0 may be used to indicate that retransmission is supported, and 1 may be used to indicate that retransmission is not supported.

It should be understood that, in actual application, indication information of each second code block may alternatively be used to indicate the code block types of the N second code blocks, or indication information of one or more second code blocks selected from the N second code blocks is used to indicate the code block types of the N second code blocks. After successfully receiving such second code blocks, the receive end may obtain the code block types of the N second code blocks, thereby improving flexibility of indicating the code block types. It can be learned that the transmit end indicates the code block type of the second code block by using the indication information in the second code block. In this way, the receive end can clearly understand the code block type of each second code block. When some second code blocks fail to be transmitted and these second code blocks are second code blocks that do not support retransmission, acknowledgment information for indicating retransmission of these second code blocks does not need to be sent to the transmit end, thereby reducing feedback overheads of the acknowledgment information.

For example, the indication information in the $i^{th}$ second code block is further used to indicate that to-be-transmitted data of the $i^{th}$ second code block includes padding bits. For example, a value of one bit in the indication information is used to indicate whether the to-be-transmitted data of the second code block includes only padding bits. For example, if the value is 0, it indicates that the to-be-transmitted data of the second code block includes only padding bits; or if the value is 1, it indicates that the to-be-transmitted data of the second code block includes not only padding bits. It should be understood that the bit used to indicate that the to-be-transmitted data includes padding bits and the bit used to indicate the code block type of the second code block may be different bits in the indication information.

It should be understood that, for a second code block whose to-be-transmitted data includes only padding bits, a code block type of the second code block is the retransmission-unsupported type. For a second code block whose to-be-transmitted data includes not only padding bits, a code block type of the second code block is determined based on a type of to-be-transmitted data of the second code block. For example, when the to-be-transmitted data of the second code block is a control message, the code block type of the second code block is the retransmission-supported type; or when the to-be-transmitted data of the second code block is image data, the code block type of the second code block is the retransmission-unsupported type.

In a wired transmission system, meaningless bits may be padded to ensure that a transmission rate is always a fixed value, thereby ensuring transmission stability. If the receive end identifies that the to-be-transmitted data of the $i^{th}$ second code block includes only padding bits, the receive end may directly discard the $i^{th}$ second code block, to avoid subsequent processing and reduce processing complexity.

Figure 5:
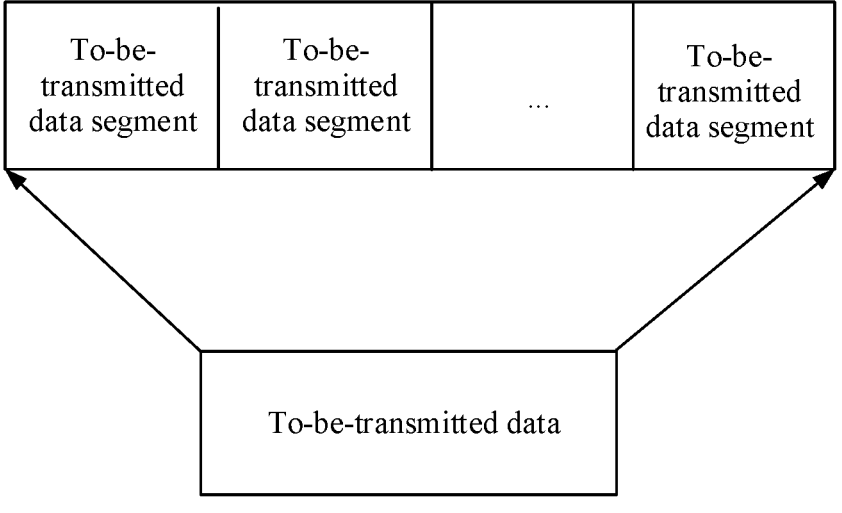
FIG. 5 is a schematic diagram of to-be-transmitted data according to an embodiment of this application.

For example, as shown in FIG. 5, the to-be-transmitted data of the $i^{th}$ second code block includes at least one to-be-transmitted data segment. A length of each to-be-transmitted data segment in the at least one to-be-transmitted data segment is an integer multiple of a sum of a length of indication information in the $i^{th}$ second code block and a length of the second redundancy code. The length mentioned in this application may be understood as a quantity of bits.

For example, if each to-be-transmitted data segment is obtained in a 64/66B encoding manner, a length of each to-be-transmitted data segment is 66 bits, and a sum of the length of the indication information and the length of the second redundancy code may be set to 6 bits, 11 bits, 22 bits, 33 bits, or 66 bits. For example, the length of the indication information may be set to 14 bits, and the length of the second redundancy code may be set to 8 bits.

It can be learned that a length of each to-be-transmitted data segment in the second code block is set to an integer multiple of a sum of a length of the indication information and a length of the second redundancy code. In this way, when channel quality is good, for example, when error detection does not need to be performed on the second code block and RS-FEC encoded data can be directly used for transmission, the to-be-transmitted data can be placed at locations corresponding to the indication information and the second redundancy code, thereby further improving data transmission efficiency. For example, when 64/66B encoding is used, and a length of the to-be-transmitted data segment is three times the sum of the length of the indication information and the length of the second redundancy code, compared with a manner of placing the indication information and the second redundancy code in the second code block, one more to-be-transmitted data segment whose length is 66 bits can be transmitted after three second code blocks are passed, thereby improving data transmission efficiency.

202: The transmit end sends the first code block to the receive end, and correspondingly, the receive end receives the first code block.

It should be understood that the receive end may first perform error correction on the first load by using the first redundancy code, to improve transmission reliability of the first code block, and then perform error detection on the second load of each second code block by using the second redundancy code of each second code block. When detecting that a transmission error occurs on a second code block, the receive end may indicate the transmit end to retransmit the second code block. In this way, when the first code block is incorrectly transmitted, the transmit end may retransmit some data carried in the first code block (the incorrectly transmitted second code block). This improves retransmission efficiency, reduces a transmission delay, and meets requirements for high reliability and a low delay of data transmission.

Figure 6:
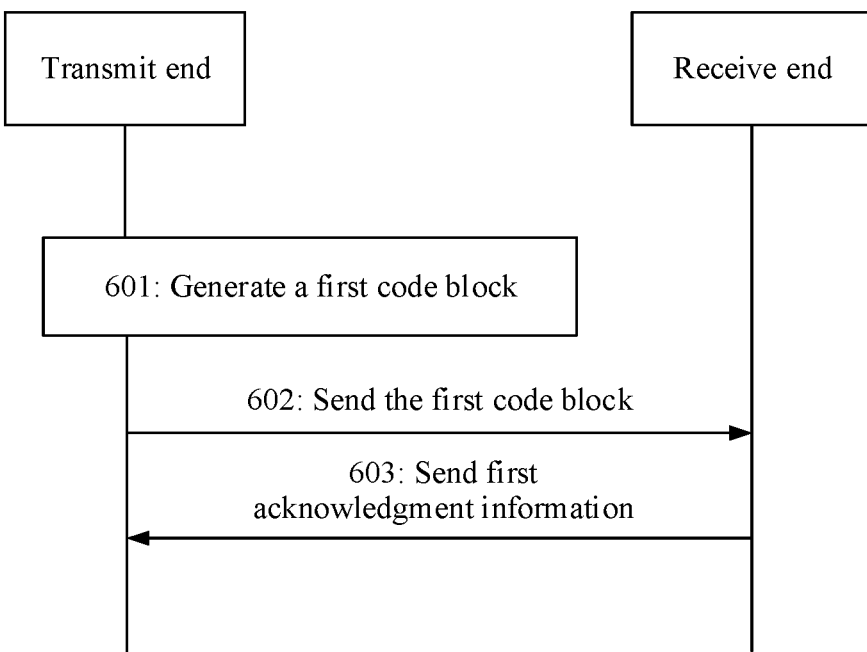
FIG. 6 is a schematic flowchart of another data transmission method according to an embodiment of this application.

FIG. 6 is a schematic flowchart of another data transmission method according to an embodiment of this application. Content in this embodiment that is the same as that in the embodiment shown in FIG. 2 is not repeatedly described herein. This embodiment includes the following steps.

601: A transmit end generates a first code block.

602: The transmit end sends the first code block to a receive end, and correspondingly, the receive end receives the first code block.

603: The receive end sends first acknowledgment information to the transmit end, and correspondingly, the transmit end receives the first acknowledgment information.

The first acknowledgment information indicates a receiving status of at least one of the N second code blocks, and a receiving status of each second code block includes a successfully received state or an unsuccessfully received state.

For example, a bitmap may be set in the first acknowledgment information to indicate the receiving status of the at least one of the N second code blocks. For example, the receiving status of each second code block may be indicated by using a bitmap. When a value of the bitmap is 1, it indicates that a receiving status of a second code block corresponding to the value is the successfully received state;

or when a value of is 0, it indicates that a receiving status of a second code block corresponding to the value is the unsuccessfully received state. It should be understood that, if a code block type of a second code block is a retransmission-unsupported type, even if the receive end fails to receive the second code block in a current transmission process, a value corresponding to the second code block may be set to 1 in the bitmap. In this way, the transmit end does not need to retransmit the second code block, thereby avoiding invalid retransmission and improving retransmission efficiency.

For example, the receiving status of the at least one of the N second code blocks may be further indicated in the first acknowledgment information by carrying identifiers of the second code blocks. For example, the first acknowledgment information may be used to indicate an unsuccessfully received second code block in the N second code blocks, that is, the first acknowledgment information may carry only an identifier of the unsuccessfully received second code block. For second code blocks that do not carry indication information, these second code blocks are considered by default to be successfully received. In this way, the transmit end may determine, by using the identifier that is of the second code block and that is carried in the first acknowledgment information, specific second code blocks are not successfully received.

It can be learned that in this embodiment, the receive end may first perform error correction on the first load by using the first redundancy code, to improve transmission reliability of the first code block, and then perform error detection on the second load of each second code block by using the second redundancy code of each second code block. When detecting that a transmission error occurs on a second code block, the receive end may feed back first acknowledgment information to the transmit end, to indicate the incorrectly transmitted second code blocks. In this way, when the first code block is incorrectly transmitted, the transmit end may retransmit, based on the acknowledgment information, some data carried in the first code block (that is, the incorrectly transmitted second code block). This improves retransmission efficiency, reduces a transmission delay, and meets requirements for high reliability and a low delay of data transmission.

It should be understood that, if a code block type of a second code block is the retransmission-unsupported type, even if the second code block is not successfully received in a current transmission process, an identifier of the second code block may not be carried in the first acknowledgment information.

Figure 7:
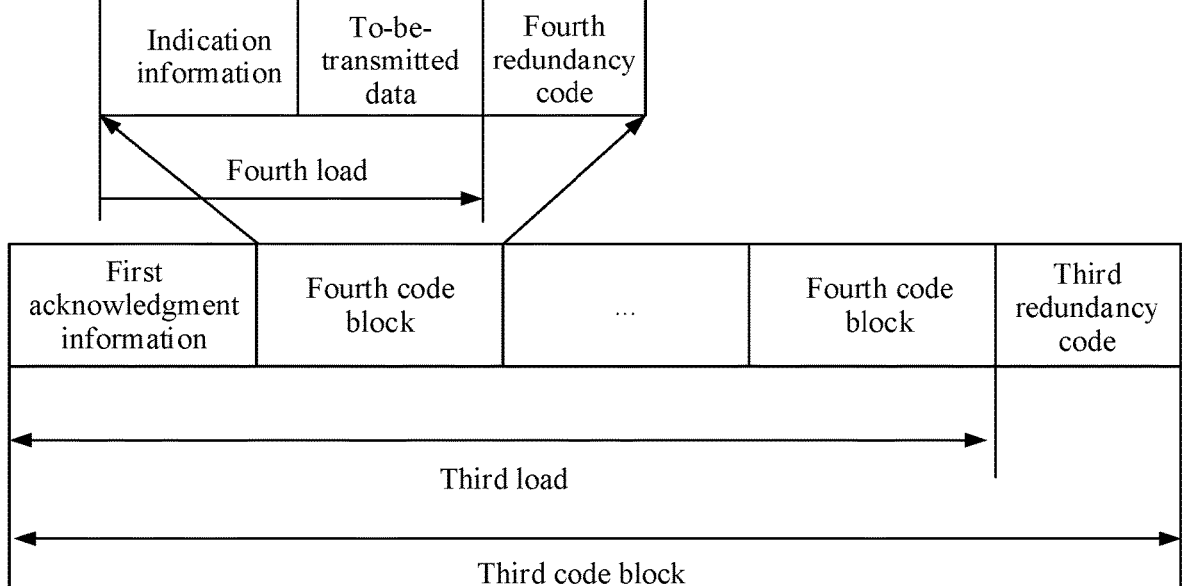
FIG. 7 is a schematic diagram of sending first acknowledgment information according to an embodiment of this application.

For example, as shown in FIG. 7, the receive end sends a third code block to the transmit end. The third code block includes first acknowledgment (Acknowledge character, ACK) information and a third redundancy code, that is, the first ACK is included in the third code block. In addition, the first ACK is used as a part of a third load of the third code block and is encoded together with data, to obtain the third code block. An encoding manner of the third code block is similar to the foregoing encoding manner of the first code block (specific parameters may be different). Details are not described again. Therefore, the third redundancy code may be used to perform error correction on the first ACK. The third redundancy code is used to perform error correction on the first ACK, so that reliability in a transmission process of the first ACK is improved.

For example, when the first ACK is included in the third code block, error correction is performed by using the third redundancy code in the third code block. In this case, error detection may be performed on the first ACK in an error detection manner with a small quantity of check codes, or no error detection is performed on the first ACK. For example, error detection may be performed on the first ACK in a parity check manner. Because a small quantity of check codes are used in an error detection process of the first ACK, feedback overheads of the first ACK are reduced.

It should be understood that the third load of the third code block shown in FIG. 7 includes a fourth code block and the first acknowledgment information shown in FIG. 7, and a manner in which the receive end generates the third code block may be similar to the foregoing manner in which the transmit end generates the first code block. Details are not described again. In addition, as shown in FIG. 7, each fourth code block includes a fourth load and a fourth redundancy code, and the fourth load includes indication information and to-be-transmitted data. It should be understood that a manner in which the receive end generates the fourth code block may be similar to the foregoing manner in which the transmit end generates the second code block. Details are not described again.

Figure 8:
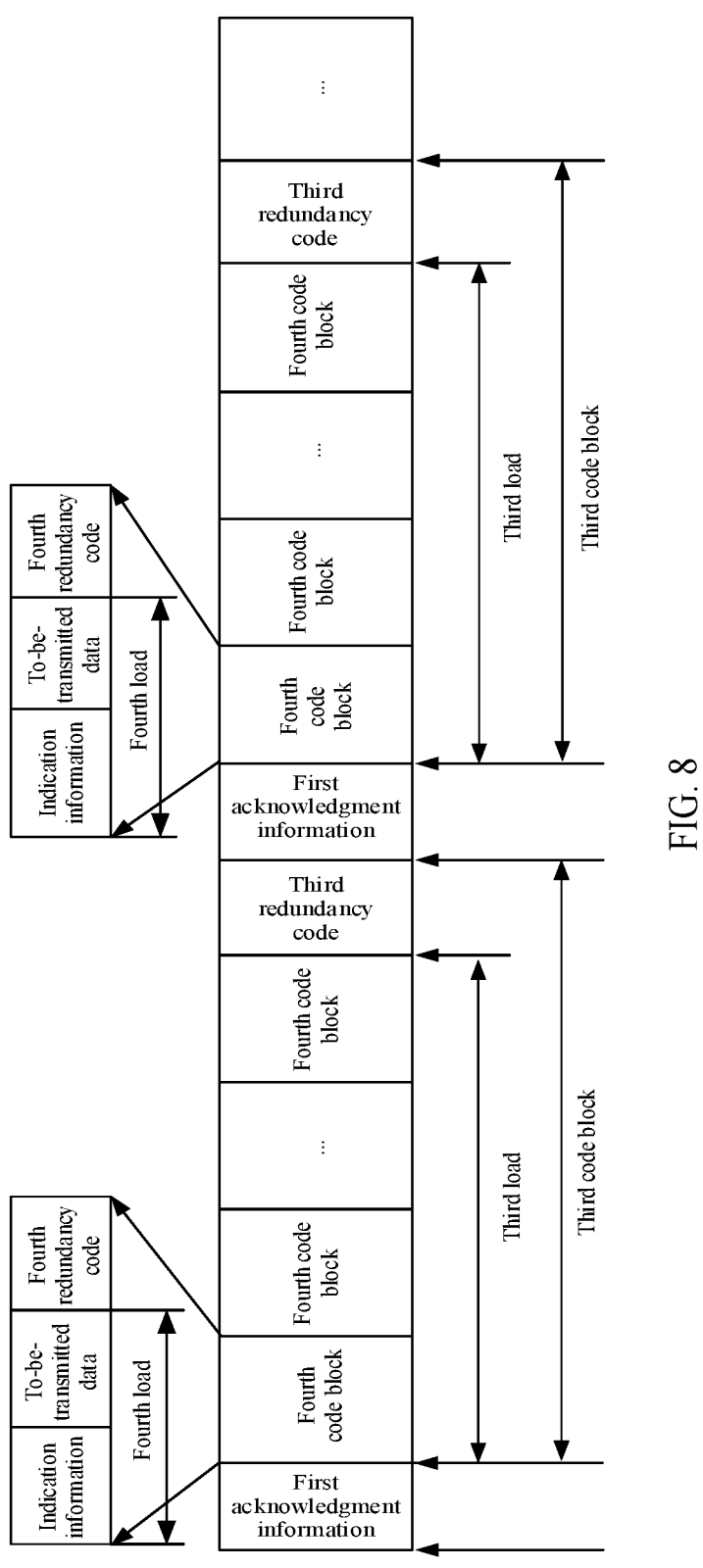
FIG. 8 is another schematic diagram of sending first acknowledgment information according to an embodiment of this application.

For example, as shown in FIG. 8, the receive end sends the first ACK to the transmit end, that is, the receive end independently sends the first ACK to the transmit end. In other words, the first ACK is outside the third code block. For example, the receive end may periodically send the first ACK to the transmit end. In this way, the receive end can flexibly send the first ACK to the transmit end, and a process in which the transmit end obtains the first ACK is not affected by the third code block. To be specific, the transmit end can obtain the first ACK without decoding the third code block, and can more quickly determine the second code block that needs to be retransmitted. This further improves retransmission efficiency and reduces a delay.

It should be understood that the load of the third code block in FIG. 8 includes the fourth code block shown in FIG. 8, and a manner in which the receive end generates the fourth code block may be similar to a manner in which the transmit end generates the third code block. Details are not described again. In addition, as shown in FIG. 8, each fourth code block includes a fourth load and a fourth redundancy code, and each fourth code block includes indication information and to-be-transmitted data. It should be understood that a manner in which the receive end generates the fourth code block may be similar to the foregoing manner in which the transmit end generates the second code block. Details are not described again.

In an implementation of this application, the transmit end may further retransmit at least one of unsuccessfully received second code blocks in the N second code blocks to the receive end based on the first acknowledgment information. For example, when the first acknowledgment information indicates that a receiving status of at least one of the N second code blocks is an unsuccessfully received state, the transmit end may determine the unsuccessfully received second code blocks in the N second code blocks based on the first acknowledgment information. For example, the transmit end may determine the unsuccessfully received second code blocks in the N second code blocks based on a bitmap in the first acknowledgment information, and retransmit at least one of the unsuccessfully received second code blocks to the receive end.

In addition, when the bandwidth is sufficient, the transmit end may retransmit all the unsuccessfully received second code blocks to the receive end; or when the bandwidth is insufficient, the transmit end may retransmit one or more of the unsuccessfully received second code blocks to the receive end.

In an implementation of this application, the transmit end may further retransmit, to the receive end based on the first acknowledgment information, at least one of the unsuccessfully received second code blocks that support retransmission and that are in the N second code blocks. For example, when the receiving status that is of at least one of the N second code blocks and that is indicated by the first acknowledgment information is an unsuccessfully received state, the transmit end may determine, based on the first acknowledgment information, an unsuccessfully received second code block in the N second code blocks, and determine that a code block type of the unsuccessfully received second code block is a second code block that supports retransmission. Then, the transmit end retransmits, to the receive end, at least one of the unsuccessfully received second code blocks that support retransmission and that are in the N second code blocks.

It should be understood that, in a process of feeding back the first acknowledgment information, the receive end considers the code block type of the second code block. When the receive end does not feed back second code blocks that do not support retransmission, the unsuccessfully received second code blocks indicated by the first acknowledgment information are actually the unsuccessfully received second code blocks that support retransmission.

In an implementation of this application, the receive end may further send second acknowledgment information to the transmit end, where the second acknowledgment information indicates a receiving status of at least one of the N second code blocks. In other words, the receive end may send a plurality of pieces of acknowledgment information to the transmit end at different moments, and second code blocks indicated by the acknowledgment information sent at the different moments may overlap.

Figure 9:
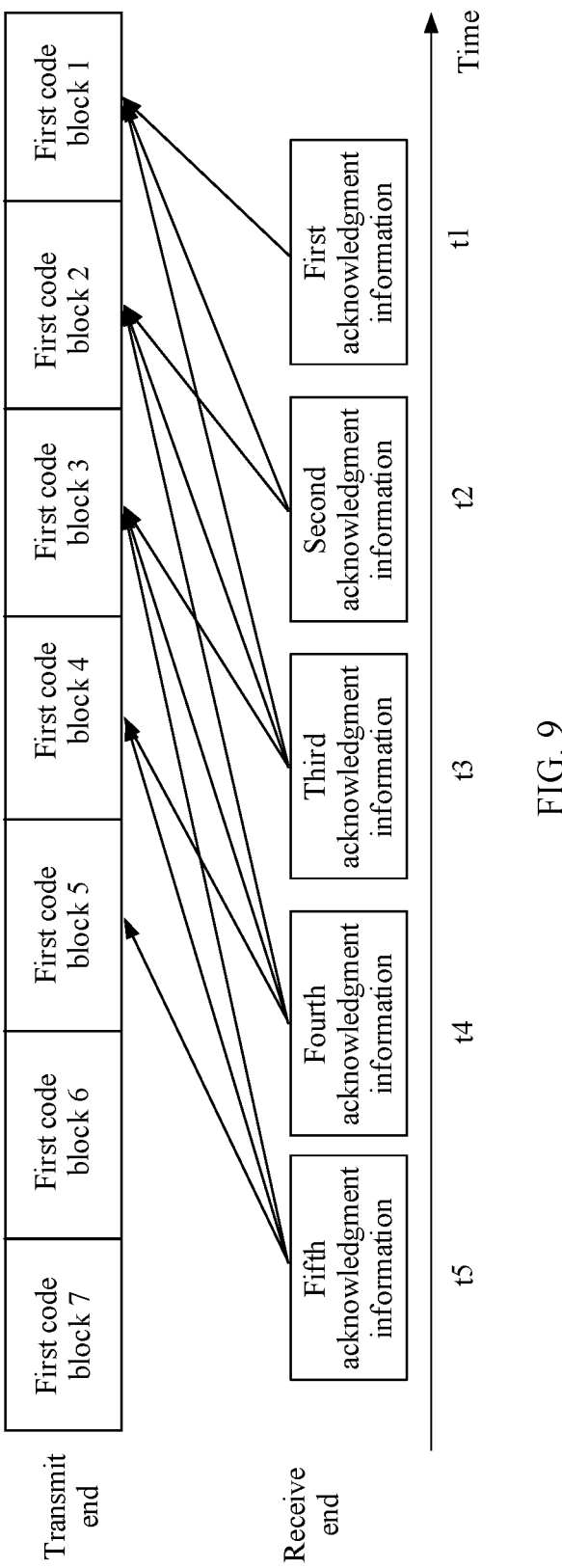
FIG. 9 is a schematic diagram of sending acknowledgment information according to an embodiment of this application.

For example, as shown in FIG. 9, the receive end may periodically send acknowledgment information to the transmit end. For example, the receive end sends first acknowledgment information to the transmit end at a moment t1, and the first acknowledgment information indicates a receiving status of at least one of the N code blocks. However, in a process of transmitting the first acknowledgment information, the transmit end may fail to decode the first acknowledgment information, that is, the transmit end fails to receive the first acknowledgment information, or the transmit end successfully receives the first acknowledgment information, but the transmit end does not retransmit unsuccessfully received second code blocks to the receive end. In this case, the receive end may further send the second acknowledgment information to the transmit end when a timing periodicity arrives, for example, at a moment t2, to indicate the receiving status of at least one of the N second code blocks by using the second acknowledgment information. It should be understood that if another first code block sent by the transmit end is further received before the receive end sends the second acknowledgment information to the transmit end, the second acknowledgment information may be further used to indicate a receiving status of at least one second code block in the another first code block.

It should be understood that when the transmit end receives the second acknowledgment information, and has not retransmitted the unsuccessfully received second code blocks in the N second code blocks to the receive end, the transmit end may retransmit at least one of the unsuccessfully received second code blocks in the N second code blocks to the receive end based on the first acknowledgment information and/or the second acknowledgment information; or retransmit, to the receive end based on the first acknowledgment information and/or the second acknowledgment information, at least one of the unsuccessfully received second code blocks that support retransmission and that are in the N second code blocks.

Correspondingly, as shown in FIG. 9, the receive end may further send third acknowledgment information, fourth acknowledgment information, fifth acknowledgment information, and the like to the transmit end. In addition, second code blocks indicated by adjacent acknowledgment information may overlap.

It should be understood that when time for feeding back the status of the unsuccessfully received second code block expires, and the transmit end has not retransmitted the unsuccessfully received second code block to the receive end, the receive end no longer sends acknowledgment information to the transmit end to indicate the unsuccessfully received second code blocks, and discards the unsuccessfully received second code blocks.

In the foregoing embodiments provided in this application, the methods provided in embodiments of this application are separately described from perspectives of the transmit end, the receive end, and interaction between the transmit end and the receive end. To implement functions in the methods provided in embodiments of this application, the transmit end and the receive end may include a hardware structure and/or a software module, and the foregoing functions are implemented in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

Figure 10:
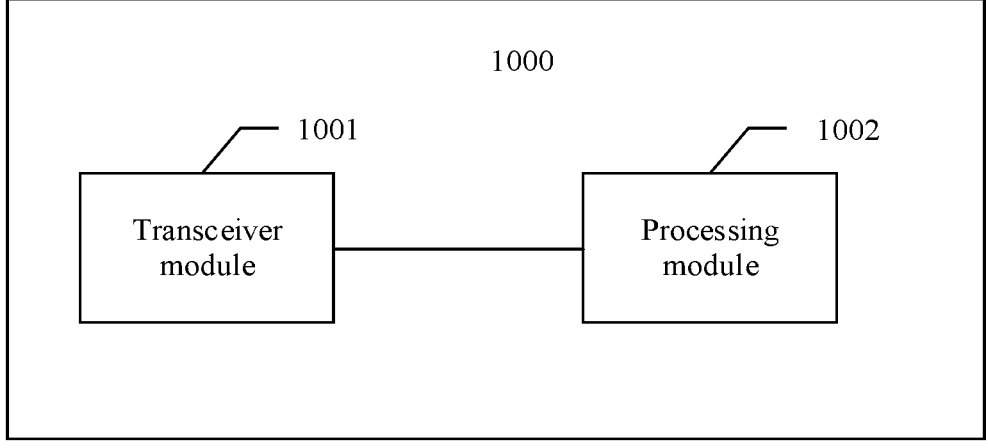
FIG. 10 is a schematic diagram of a structure of a communications apparatus according to an embodiment of this application.
Figure 11:
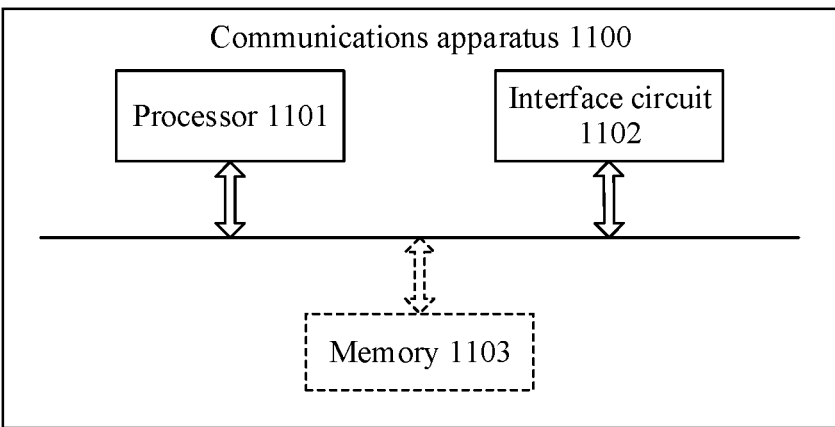
FIG. 11 is a schematic diagram of a structure of another communications apparatus according to an embodiment of this application.

FIG. 10 and FIG. 11 each are a schematic diagram of a structure of a communications apparatus according to an embodiment of this application. These communications apparatuses can implement functions of the transmit end or the receive end in the foregoing method embodiments, and therefore can also implement beneficial effects of the foregoing method embodiments. In this embodiment of this application, the communications apparatus may be the transmit end 10 shown in FIG. 1, or may be the receive end 20 shown in FIG. 1, or may be a module (for example, a chip) applied to a transmit end or a receive end.

As shown in FIG. 10, a communications apparatus 1000 includes a transceiver module 1001 and a processing module 1002. The communications apparatus 1000 may be configured to implement the functions of the transmit end or the receive end in the method embodiments shown in FIG. 2 and FIG. 6.

That the communications apparatus 1000 is configured to implement the functions of the transmit end in the method embodiments in FIG. 2 and FIG. 6 is as follows.

The processing module 1002 is configured to generate a first code block, where the first code block includes a first load and a first redundancy code, the first load includes N second code blocks, the first redundancy code is used to perform error correction on the first load, an $i^{th}$ second code block includes a second load and a second redundancy code, the second redundancy code is used to perform error detection on the second load in the $i^{th}$ second code block, a value of i is an integer ranging from 1 to N, and N is an integer greater than or equal to 1.

The transceiver module 1001 is configured to send the first code block to the receive end.

That the communications apparatus 1000 is configured to implement the functions of the receive end in the method embodiments in FIG. 2 and FIG. 6 is as follows.

The transceiver module 1001 is configured to receive a first code block from the transmit end, where the first code block includes a first load and a first redundancy code, the first load includes N second code blocks, an $i^{th}$ second code block includes a second load and a second redundancy code, a value of i is an integer ranging from 1 to N, and N is an integer greater than or equal to 1.

The processing module 1002 is configured to: perform error correction on the first load by using the first redundancy code, and perform error detection on the second load in the $i^{th}$ second code block by using the second redundancy code.

For more detailed descriptions of the transceiver module 1001 and the processing module 1002, refer to related descriptions in the foregoing method embodiments. Details are not described herein again.

As shown in FIG. 11, a communications apparatus 1100 includes a processor 1101 and an interface circuit 1102. The processor 1101 and the interface circuit 1102 are coupled to each other. It may be understood that the interface circuit 1102 may be a transceiver or an input/output interface. Optionally, the communications apparatus 1100 may further include a memory 1103 configured to: store instructions executed by the processor 1101, store input data required by the processor 1101 to run instructions, or store data generated after the processor 1101 runs instructions.

When the communications apparatus 1100 is configured to implement the method in the foregoing method embodiment, the processor 1101 is configured to perform functions of the processing module 1002, and the interface circuit 1102 is configured to perform functions of the transceiver module 1001.

When the communications apparatus is a chip applied to a transmit end, the chip in the transmit end implements functions of the transmit end in the foregoing method embodiments. The chip in the transmit end receives information from another module (for example, a radio frequency module or an antenna) in the transmit end, where the information is sent by the receive end to the transmit end; or the chip in the transmit end sends information to another module (for example, a radio frequency module or an antenna) in the transmit end, where the information is sent by the transmit end to the receive end.

When the communications apparatus is a chip applied to a receive end, the chip in the receive end implements functions of the receive end in the foregoing method embodiments. The chip in the receive end receives information from another module (for example, a radio frequency module or an antenna) in the receive end, where the information is sent by the transmit end to the receive end; or the chip in the receive end sends information to another module (for example, a radio frequency module or an antenna) in the receive end, where the information is sent by the receive end to the transmit end.

An embodiment of this application further provides a communications system, including the foregoing communications apparatus for implementing the functions of the transmit end and the foregoing communications apparatus for implementing the functions of the receive end.

It may be understood that, the processor in embodiments of this application may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random-access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be disposed in a receive end or a transmit end. Certainly, the processor and the storage medium may exist in the receive end or the transmit end as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs or instructions. When the computer programs or the instructions are loaded and executed on a computer, the processes or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted by using a computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a digital video disc (DVD); or may be a semiconductor medium, for example, a solid-state disk (SSD).

In embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences, and the execution sequences of the processes should be determined based on functions and internal logic of the processes.

What is claimed is:

1. A method, applied to a transmit end, and comprising:
generating a first code block comprising a first load and a first redundancy code, wherein the first load comprises N second code blocks, wherein the first redundancy code is configured to perform error correction on the first load, wherein an $i^{th}$ second code block of the N second code blocks comprises a second load and a second redundancy code, wherein the second redundancy code is configured to perform error detection on the second load in the $i^{th}$ second code block, wherein the second load comprises indication information and to-be-transmitted data, wherein the indication information indicates an identifier of the $i^{th}$ second code block and indicates one of a code block type of the $i^{th}$ second code block is a retransmission-supported type, a code block type of the $i^{th}$ second code block is a retransmission-unsupported type, or the to-be-transmitted data of the $i^{th}$ second code block comprises padding bits, wherein i is an integer ranging from 1 to N, and wherein N is an integer greater than or equal to 1; and
sending the first code block to a receive end.

2. The method of claim 1, further comprising receiving first acknowledgment information from the receive end, wherein the first acknowledgment information indicates a receiving status of at least one of the N second code blocks.

3. The method of claim 2, wherein receiving the first acknowledgment information from the receive end comprises receiving a third code block from the receive end, wherein the third code block comprises the first acknowledgment information and a third redundancy code, and wherein the third redundancy code is configured to perform error correction on the first acknowledgment information.

4. The method of claim 3, further comprising retransmitting, to the receive end based on the first acknowledgment information, at least one unsuccessfully received second code block that supports retransmission and that is in the N second code blocks.

5. The method of claim 2, further comprising retransmitting, to the receive end, at least one unsuccessfully received second code block in the N second code blocks based on the first acknowledgment information.

6. The method of claim 1, further comprising:
performing Reed-Solomon forward error correction (RS-FEC) encoding on the first load to obtain the first redundancy code; and
performing cyclic redundancy check (CRC) encoding on the second load in the $i^{th}$ second code block to obtain the second redundancy code.

7. The method of claim 1, wherein when a value of the indication information is a first preset value, the code block type is the retransmission-unsupported type, or wherein when the value is not the first preset value, the code block type is the retransmission-supported type.

8. A data transmission method, applied to a receive end, and comprising:

receiving a first code block from a transmit end, wherein the first code block comprises a first load and a first redundancy code, wherein the first load comprises N second code blocks, wherein an $i^{th}$ second code block of the N second code blocks comprises a second load and a second redundancy code, wherein the second load comprises indication information and to-be-transmitted data, wherein the indication information indicates an identifier of the $i^{th}$ second code block and indicates one of a code block type of the $i^{th}$ second code block is a retransmission-supported type, a code block type of the $i^{th}$ second code block is a retransmission-unsupported type, or the to-be-transmitted data of the $i^{th}$ second code block comprises padding bits, wherein i is an integer ranging from 1 to N, and wherein N is an integer greater than or equal to 1;
performing error correction on the first load by using the first redundancy code; and
performing error detection on the second load by using the second redundancy code.

9. The method of claim 8, further comprising sending first acknowledgment information to the transmit end, wherein the first acknowledgment information indicates a receiving status of at least one of the N second code blocks.

10. The method of claim 9, wherein sending the first acknowledgment information to the transmit end comprises sending a third code block to the transmit end, wherein the third code block comprises the first acknowledgment information and a third redundancy code, and wherein the third redundancy code is configured to perform error correction on the first acknowledgment information.

11. The method of claim 9, further comprising receiving, from the transmit end and through retransmission, at least one unsuccessfully received second code block in the N second code blocks.

12. The method of claim 8, wherein when a value of the indication information is a first preset value, the code block type is the retransmission-unsupported type, or wherein when the value is not the first preset value, the code block type is the retransmission-supported type.

13. The method of claim 8, further comprising receiving, from the transmit end and through retransmission, at least one unsuccessfully received second code block that is in the N second code blocks and that supports retransmission.

14. A communications apparatus, comprising:
a memory configured to store executable instructions; and
a processor coupled to the memory and configured to execute the instructions to cause the communications apparatus to:
generate a first code block comprising a first load and a first redundancy code, wherein the first load comprises N second code blocks, wherein the first redundancy code is configured to perform error correction on the first load, wherein an $i^{th}$ second code block of the N second code blocks comprises a second load and a second redundancy code, wherein the second redundancy code is configured to perform error detection on the second load in the $i^{th}$ second code block, wherein the second load comprises indication information and to-be-transmitted data, wherein the indication information indicates an identifier of the $i^{th}$ second code block and indicates one of a code block type of the $i^{th}$ second code block is a retransmission-supported type, a code block type of the $i^{th}$ second code block is a retransmission-unsupported type, or the to-be-transmitted data of the $i^{th}$ second code block comprises padding bits, wherein i is an integer ranging from 1 to N, and wherein N is an integer greater than or equal to 1; and send the first code block to a receive end.

15. The communications apparatus of claim 14, wherein the processor is further configured to execute the instructions to cause the communications apparatus to receive first acknowledgment information from the receive end, wherein the first acknowledgment information indicates a receiving status of at least one of the N second code blocks.

16. The communications apparatus of claim 15, wherein the processor is further configured to execute the instructions to cause the communications apparatus to retransmit, to the receive end, at least one unsuccessfully received second code block in the N second code blocks based on the first acknowledgment information.

17. The communications apparatus of claim 15, wherein the processor is configured to execute the instructions to cause the communications apparatus to receive the first acknowledgment information from the receive end by receiving a third code block from the receive end, wherein the third code block comprises the first acknowledgment information and a third redundancy code, and wherein the third redundancy code is configured to perform error correction on the first acknowledgment information.

18. The communications apparatus of claim 17, wherein the processor is further configured to execute the instructions to cause the communications apparatus to retransmit, to the receive end based on the first acknowledgment information, at least one unsuccessfully received second code block that supports retransmission and that is in the N second code blocks.

19. The communications apparatus of claim 14, further comprising:

performing Reed-Solomon forward error correction (RS-FEC) encoding on the first load to obtain the first redundancy code; and performing cyclic redundancy check (CRC) encoding on the second load in the $i^{th}$ second code block to obtain the second redundancy code.

20. The communications apparatus of claim 14, wherein when a value of the indication information is a first preset value, the code block type is the retransmission-unsupported type, or wherein when the value is not the first preset value, the code block type is the retransmission-supported type.

21. A communications apparatus, comprising:

a memory configured to store executable instructions; and a processor coupled to the memory and configured to execute the instructions to cause the communications apparatus to:

receive a first code block from a transmit end, wherein the first code block comprises a first load and a first redundancy code, wherein the first load comprises N second code blocks, wherein an $i^{th}$ second code block of the N second code blocks comprises a second load and a second redundancy code, wherein the second load comprises indication information and to-be-transmitted data, wherein the indication information indicates an identifier of the $i^{th}$ second code block and indicates one of a code block type of the $i^{th}$ second code block is a retransmission-supported type, a code block type of the $i^{th}$ second code block is a retransmission-unsupported type, or the to-be-transmitted data of the $i^{th}$ second code block comprises padding bits, wherein i is an integer ranging from 1 to N, and wherein Nis an integer greater than or equal to 1;

perform error correction on the first load using the first redundancy code; and perform error detection on the second load using the second redundancy code.

22. The communications apparatus of claim 21, wherein the processor is further configured to execute the instructions to cause the communications apparatus to send first acknowledgment information to the transmit end, wherein the first acknowledgment information indicates a receiving status of at least one of the N second code blocks.

23. The communications apparatus of claim 22, wherein the processor is configured to execute the instructions to cause the communications apparatus to send the first acknowledgment information to the transmit end by sending a third code block to the transmit end, wherein the third code block comprises the first acknowledgment information and a third redundancy code, and wherein the third redundancy code is configured to perform error correction on the first acknowledgment information.

24. The communications apparatus of claim 22, wherein the processor is further configured to execute the instructions to cause the communications apparatus to receive, from the transmit end and through retransmission, at least one unsuccessfully received second code block in the N second code blocks.

25. The communications apparatus of claim 21, wherein when a value of the indication information is a first preset value, the code block type is the retransmission-unsupported type, or when the value is not the first preset value, the code block type is the retransmission-supported type.

26. The communications apparatus of claim 21, wherein the processor is further configured to execute the instructions to cause the communications apparatus to receive, from the transmit end and through retransmission, at least one unsuccessfully received second code block that is in the N second code blocks and that supports retransmission.

* * * * *